(12) United States Patent
Oh

(10) Patent No.: US 7,774,018 B2
(45) Date of Patent: Aug. 10, 2010

(54) MULTIBAND-MULTIMODE MOBILE COMMUNICATION TERMINAL AND ITS MULTITASKING METHOD

(75) Inventor: Young-Il Oh, Seongnam-si (KR)

(73) Assignee: KT Tech, Inc., Seongnam-si (KR)

( * ) Notice: Subject to any disclaimer, the term of this patent is extended or adjusted under 35 U.S.C. 154(b) by 601 days.

(21) Appl. No.: 11/881,544

(22) Filed: Jul. 27, 2007

(65) Prior Publication Data
US 2007/0270131 A1 Nov. 22, 2007

Related U.S. Application Data

(63) Continuation of application No. PCT/KR2006/003655, filed on Sep. 14, 2006.

(30) Foreign Application Priority Data

Nov. 28, 2005 (KR) ........................ 10-2005-0114092

(51) Int. Cl.
*H04M 1/00* (2006.01)
(52) U.S. Cl. .................................. 455/550.1; 455/3.06
(58) Field of Classification Search .............. 455/550.1, 455/3.06, 42, 102
See application file for complete search history.

(56) References Cited

U.S. PATENT DOCUMENTS 6,826,174 B1 * 11/2004 Erekson et al. ............. 370/352
6,999,718 B2 * 2/2006 Miyazaki ..................... 455/7
2003/0065846 A1 * 4/2003 Bennett ..................... 710/107

FOREIGN PATENT DOCUMENTS

| KR | 10 2004 0098715 A | 11/2004 |
| KR | 10 2004 0107813 A | 12/2004 |
| KR | 10 2005 0034096 A | 4/2005 |
| KR | 10 2005 0050917 A | 6/2005 |

* cited by examiner

*Primary Examiner*—Tu X Nguyen
(74) *Attorney, Agent, or Firm*—Knobbe Martens Olson & Bear LLP

(57) ABSTRACT

An MB-MM mobile communication terminal having multiple multimedia functions is disclosed. In one embodiment, the MB-MM mobile terminal includes a first modem having a first codec unit, and a second modem having a second codec unit. The first modem controls the first codec unit to process data and outputs a data processing order to have the second codec unit process data if the first codec unit is processing other data. The second modem activates the second codec unit if the data processing order is inputted and controls the second codec unit to process data corresponding to the data processing order. At least one of embodiment of the present invention enables using multiple codec units simultaneously or independently in an MB-MM mobile communication terminal.

17 Claims, 4 Drawing Sheets

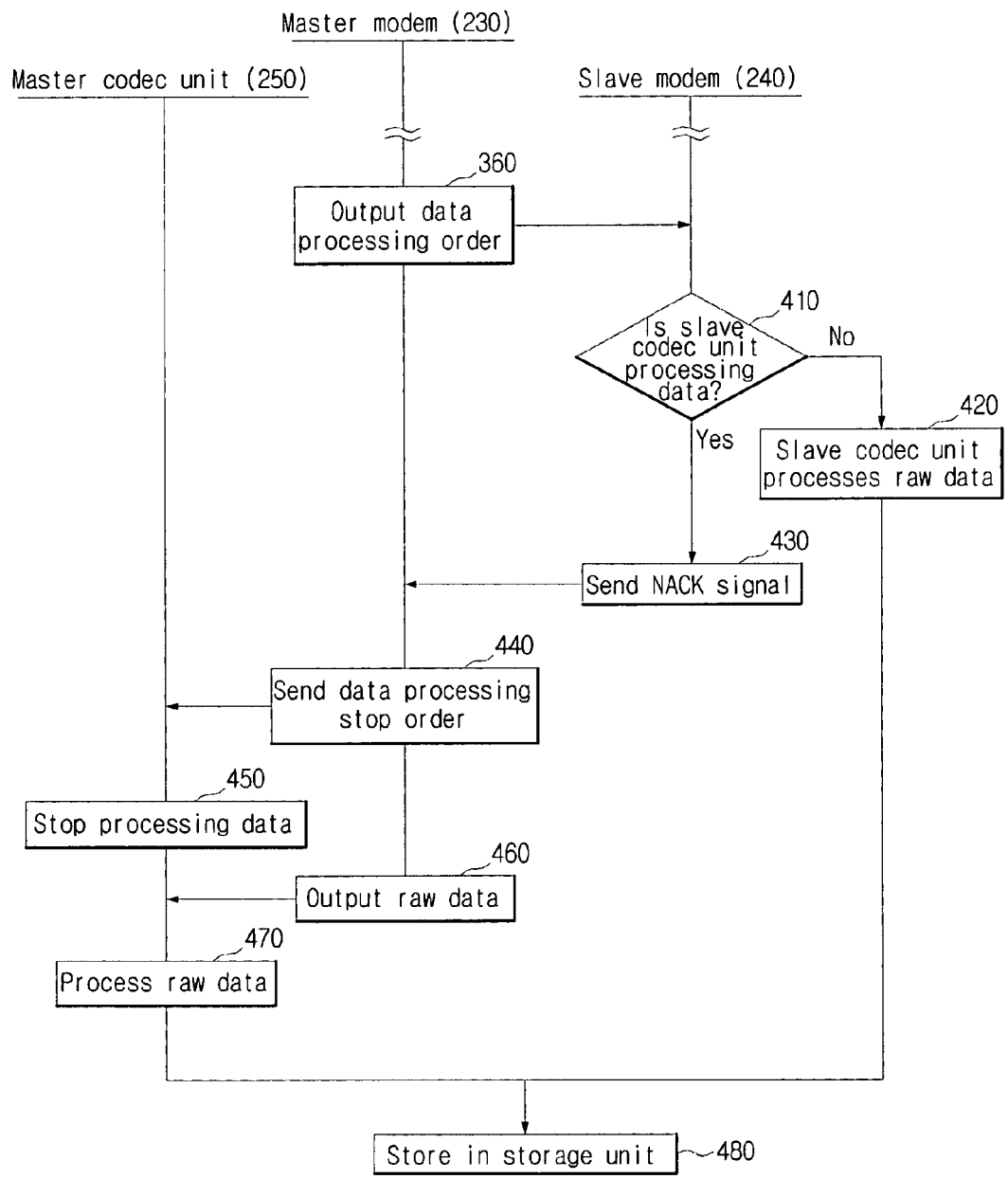

MULTIBAND-MULTIMODE MOBILE COMMUNICATION TERMINAL AND ITS MULTITASKING METHOD

RELATED APPLICATIONS

This application is a continuation application, and claims the benefit under 35 U.S.C. §§120 and 365 of PCT Application No. PCT/KR2006/003655, filed on Sep. 14, 2006, which is hereby incorporated by reference.

BACKGROUND OF THE INVENTION

1. Field of the Invention

The present invention relates to a mobile communication terminal, more specifically to a multiband-multimode (MB-MM) mobile communication terminal and its multitasking method.

2. Description of the Related Technology

Generally, a mobile communication terminal is a portable device that can provide a voice communication with a person at a distant place. At the beginning, a portable terminal could provide a voice communication only, but it is being developed to a data communication device using letters and symbols as well as video signals.

A code division multiple access (referred to as "CDMA" hereinafter) communication system has been suited for a voice and data communication method using letters and symbols because of relatively smaller data sizes. However, the recent multimedia communication system using video signals requires a communication system that has a faster data transmission speed because of larger data sizes. The system to suit this requirement is the third generation partnership project (3GPP), for example, the wideband code division multiple access (referred to as "WCDMA" hereinafter).

Moreover, the mobile communication terminal can be classified according to the method of accessing a mobile communication network. That is, there can be a portable terminal that provides a voice and data communication by accessing a CDMA mobile communication system, a portable terminal that provides a multimedia communication by accessing a WCDMA mobile communication system, and an MB-MM mobile communication terminal that communicates by selectively accessing a CDMA mobile communication system and a WCDMA mobile communication system.

SUMMARY OF CERTAIN INVENTIVE ASPECTS

One aspect of the present invention provides an MB-MM mobile communication terminal that is able to use multiple codec units simultaneously or independently and its multitasking method in the MB-MM mobile communication terminal.

Another aspect of this invention provides an MB-MM mobile communication terminal that is able to operate multiple multimedia functions simultaneously and its multitasking method in the MB-MM mobile communication terminal.

Another aspect of the present invention provides an MB-MM mobile communication terminal having multiple multimedia functions. The MB-MM mobile communication terminal has a first modem and a second modem. The first modem has a first codec unit, and the second modem has a second codec unit. The first modem controls the first codec unit to process data and outputs a data processing order to have the second codec unit process data if the first codec unit is processing other data, and the second modem activates the second codec unit if the data processing order is inputted and controls the second codec unit to process data corresponding to the data processing order.

In one embodiment, the second modem outputs a non-acknowledgment (NACK) signal to the first modem if the data processing order is inputted from the first modem while the activated second codec unit is processing other data.

In one embodiment, the first modem controls the MB-MM mobile communication terminal to enable a user to choose a codec unit to stop data processing if the NACK signal is inputted from the second modem, and outputs a data processing stop order to a codec unit corresponding to a codec unit choice signal if a codec unit choice signal corresponding to a user's button operation is inputted.

In one embodiment, the first modem outputs a data processing stop order to a predetermined codec unit if the NACK signal is inputted from the second modem.

In one embodiment, the MB-MM mobile communication terminal also includes an interface unit for interchanging a message between the first modem and the second modem. Through the interface unit, the first modem outputs the data processing order to the second modem, and the second modem outputs the NACK signal to the first modem.

In one embodiment, the MB-MM mobile communication terminal having multiple multimedia functions multitasks through several steps. A first modem determines whether a first codec unit is processing other data. The first modem outputs a data processing order to a second modem such that data is processed in a second codec unit, if the first codec unit is processing other data. The second modem outputs an ACK signal to the first modem after activating the second codec unit if the second codec unit is not activated. The second codec unit processes data corresponding to the data processing order. The first modem comprises the first codec unit, and the second modem comprises the second codec unit.

The second modem can determine whether the second codec unit is processing other data, if the data processing order is inputted from the first modem.

The second modem can output an NACK signal to the first modem, if the second codec unit is processing other data. The first modem can control the MB-MM mobile communication terminal to enable a user to choose a codec unit to stop data processing if the NACK signal is inputted from the second modem. If a codec unit choice signal corresponding to a user's button operation is inputted, the first modem can output a data processing stop order to the codec unit corresponding to a codec unit choice signal. A codec unit, having received the data processing stop order, stops processing the data and processes new inputted data.

In one embodiment, in the multitasking method, the second modem outputs an NACK signal to the first modem if the second codec unit is processing other data. The first modem outputs a data processing stop order to a predetermined codec unit if the NACK signal is inputted by the second modem. A codec unit, having received the data processing stop order, stops processing the data and processes new inputted data.

In one embodiment, in the multitasking method, the first codec unit is included in the first modem and is controlled by the first modem.

In one embodiment, the second codec unit is included in the second modem and is controlled by the second modem.

In the multitasking method, the MB-MM mobile communication terminal can further comprise an interface unit interchanging a message between the first modem and the second modem. The first modem outputs the data processing order to the second modem, and the second modem outputs the NACK signal to the first modem, through the interface unit.

Another aspect of the present invention provides a multiband-multimode (MB-MM) mobile communication terminal having multiple multimedia functions, the MB-MM mobile communication terminal comprising: a first modem, comprising a first codec unit, configured to i) control the first codec unit to process a first data and ii) output a data processing order if the first codec unit is processing a second data different from the first data and a second modem, comprising the second codec unit, configured to i) activate the second codec unit based on the data processing order and ii) control the second codec unit to process the first data according to the data processing order.

Still another aspect of the present invention provides a multitasking method in a multiband-multimode (MB-MM) mobile communication terminal having multiple multimedia functions, the multitasking method comprising: i) determining whether a first codec unit of a first modem is processing a first data, ii) outputting a data processing order to a second modem such that the first data is processed in a second codec unit of the second modem, if the first codec unit is processing a second data different from the first data iii) outputting an acknowledgement (ACK) signal to the first modem after activating the second codec unit if the second codec unit is not activated and iv) processing, at the second codec unit, the first data according to the data processing order.

Still another aspect of the present invention provides a multitasking method in a multiband-multimode (MB-MM) mobile communication terminal having multiple multimedia functions, the method comprising: i) determining whether a first codec unit of a first modem is processing a first data, ii) outputting a data processing order to a second modem if the first codec unit is processing a second data different from the first data and iii) processing, at a second codec unit of the second modem, the first data according to the data processing order.

Yet another aspect of the present invention provides a multiband-multimode (MB-MM) mobile communication terminal having multiple multimedia functions, the MB-MM mobile communication terminal comprising: i) means for determining whether a first codec unit of a first modem is processing a first data, ii) means for outputting a data processing order to a second modem if the first codec unit is processing a second data different from the first data and iii) means for processing, at a second codec unit of the second modem, the first data according to the data processing order.

BRIEF DESCRIPTION OF THE DRAWINGS

Embodiments of the present invention will be described by referring to accompanying drawings.

FIG. 4 shows a flowchart of a multitasking method based on another embodiment the present invention.

DESCRIPTION OF CERTAIN INVENTIVE EMBODIMENTS

Figure 1:
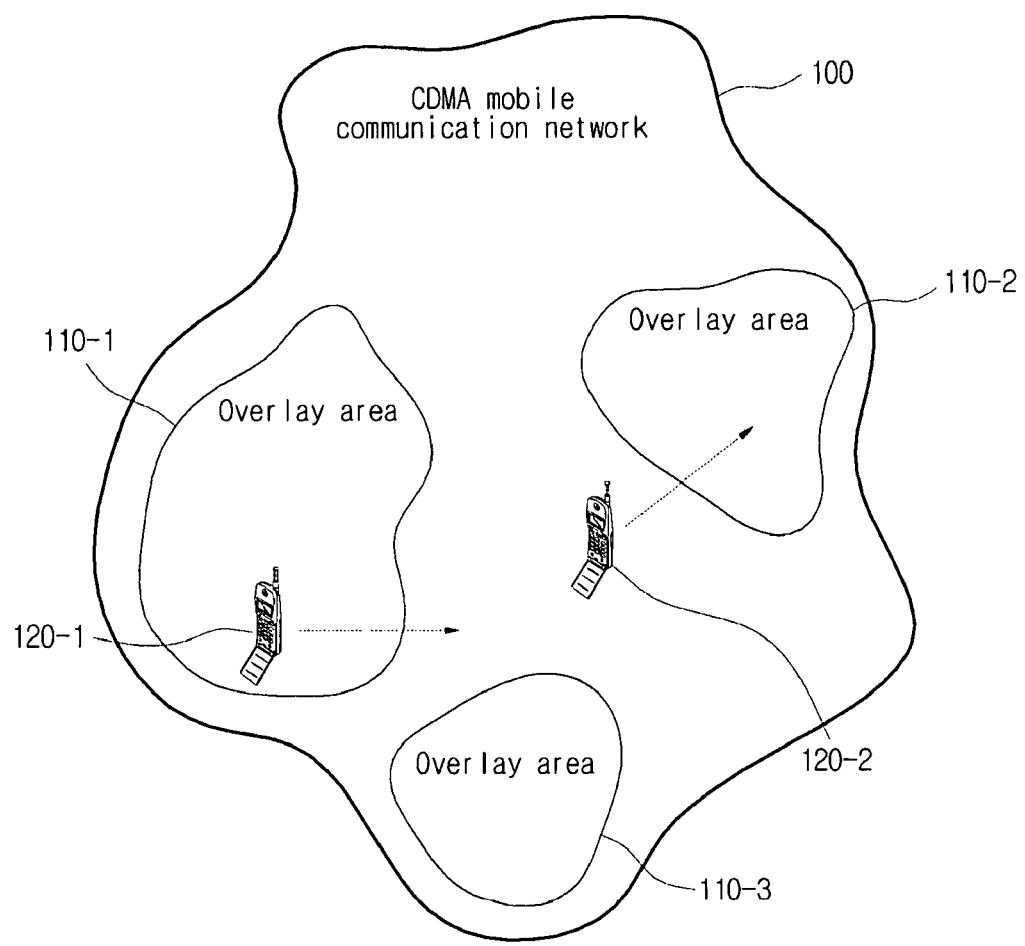
FIG. 1 shows an illustration of a mobile communication network for providing a WCDMA service in a communication environment in which a CDMA communication network is fundamentally established.

Hereinafter, embodiments of the present invention shall be described in detail with reference to the accompanying drawings. The same reference numeral shall be assigned to the same means, regardless of the figure number Ordinal numbers (e.g. first, second, etc.) are used for description only, assigned to the elements in no particular order, and shall by no means specify the name of the pertinent element or restrict the claims.

It is appreciated that the following description is merely exemplary. Therefore anyone of ordinary skill in the art shall be able to easily embody various apparatuses and/or methods, although not described or depicted, within the scope of the present invention. Moreover, it shall be understood that the principles, points of view, and embodiments of the present invention comprise functional and structural permutations.

Moreover, although the embodiments describe an MB-MM mobile communication terminal with a master modem and a slave modem each, it shall be evident that 2 or more slave modems can be provided in the MB-MM mobile communication terminal.

Moreover, for convenience, a first modem is defined as a master modem, and a second modem as a slave modem, but the present invention shall not be restricted by these terms (i.e., first, second, master, and slave).

FIG. 1 shows an illustration of a mobile communication network for providing a WCDMA service in a communication environment in which a CDMA mobile communication network is fundamentally established.

As shown in FIG. 1, the current CDMA communication service is provided in a vast coverage area 100. However, a WCDMA communication service is provided in sections, represented by 110-1, 110-2, 110-3 (referred to as "110" hereinafter) of the coverage area of the CDMA communication service. Therefore, some areas of the CDMA communication service coverage area can coincide with the WCDMA communication service areas, and these areas can be referred to as overlay areas 110. Of course, the WCDMA communication service area can exist independently outside a CDMA communication service coverage area.

Co-present in the overlay areas are both a CDMA communication network, which is the second generation mobile communication network, and a WCDMA mobile communication network, which is a third generation mobile communication network. Therefore, a user has to have an MB-MM mobile communication terminal (120-1, 120-2, referred to as "120" hereinafter) that encompasses both a CDMA modem and a WCDMA modem, which are selectively driven.

As described above, with the development of multimedia communication methods, a user has to have an MB-MM mobile communication terminal 120 in order to use a communication service in an MB-MM mobile communication system. Moreover, the development of multimedia communication methods encourages mobile communication terminals to encompass various multimedia features in addition to their function of voice communication Typical examples of these multimedia features include MP3 players, cameras, camcorders and media players.

Nevertheless, typical mobile communication terminals (both multimode terminals and standalone terminals) could not perform a plural number of multimedia functions at the same time. For example, in order to operate an MP3 player while utilizing the camera function, the camera function generally needs to be stopped, either by the command of the user and/or by an automatic control of the main controller.

Therefore, although typical mobile communication terminals are equipped with a plurality of multimedia functions, they have not been able to multitask the plural number of multimedia functions (e.g. MP3 player, camera).

Figure 2:
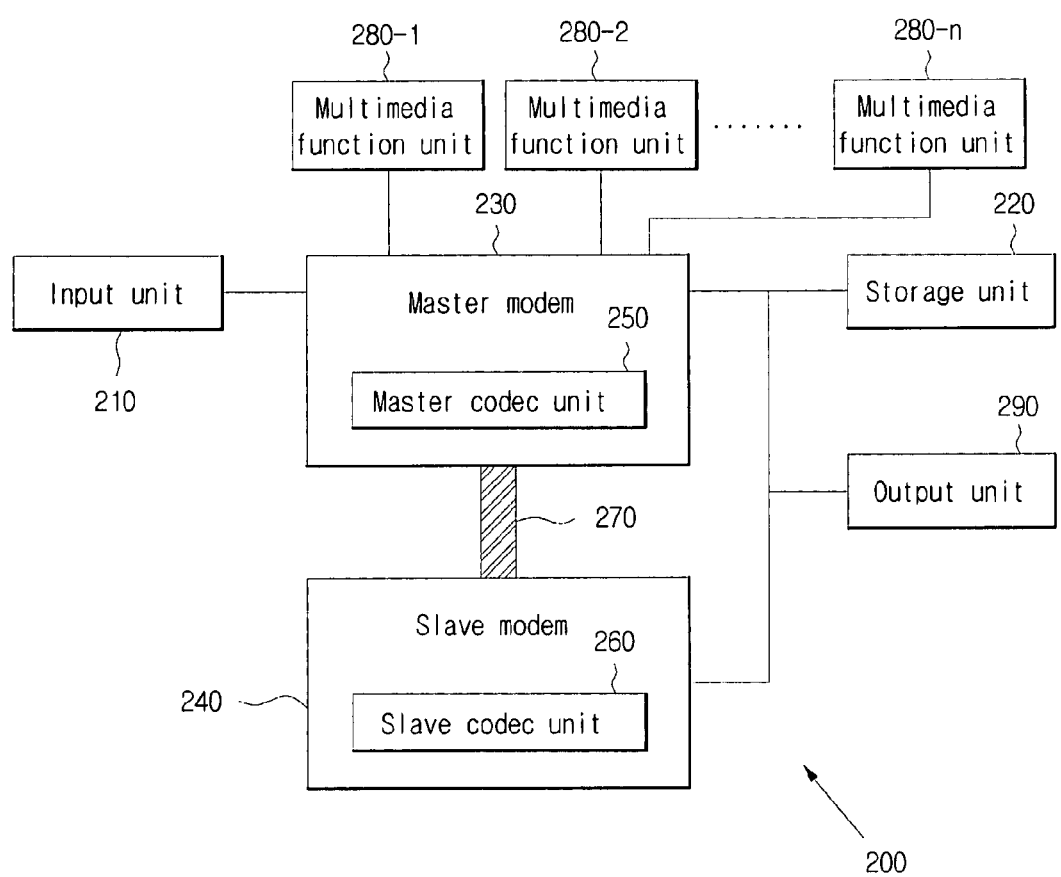
FIG. 2 shows a block diagram of an MB-MM mobile communication terminal based on one embodiment of the present invention.

FIG. 2 shows a block diagram of an MB-MM mobile communication terminal based on one embodiment of the present invention.

Referring to FIG. 2, an MB-MM mobile communication terminal 200 based on one embodiment of the present invention comprises an input unit 210, a storage unit 220, a master modem 230, a slave modem 240, a master codec unit 250, a slave codec unit 260, an interface unit 270, and a plurality of multimedia function units 280-1, 280-2, ..., 280-n (referred to as "280" hereinafter). The MB-MM mobile communication terminal 200 can, of course, further comprise an antenna and a duplexer, but these components are optional, and, and, thus the description thereof will be omitted.

The input unit 210 comprises a plurality of buttons, and outputs to the master modem 230 a generated signal, which is generated by the user's button operation. Particularly, if the user's button operation give a specific instruction to process specific data, the input unit 210 outputs a signal for processing the data corresponding to the user's button operation (referred to as "data processing order" hereinafter) to the master modem 230. The input unit 210 can be a number pad and/or a touch pad.

The storage unit 220 stores one or more multimedia data and various kinds of parameter for the communication of the MB-MM mobile communication terminal 200.

The master modem 230 comprises the master codec unit 250, and processes and controls various kinds of signals in the base band when the MB-MM mobile communication terminal 200 functions in a master mode (that is, a communication mode using a communication system corresponding to the master modem 230). Particularly, if an order to output data is inputted, the master modem 230 accesses the storage unit 220 and reads multimedia data corresponding to the data output order. Moreover, if an order to store data is inputted, the master modem 230 accesses the multimedia function unit 280 and receives data corresponding to the data store order (i.e., data not processed by a codec unit, for example, raw data outputted by an image sensor or YUV data processed by an image signal processor, hereinafter referred to as "raw data"). In other words, the master modem 230 receives multimedia data stored in the storage unit 220 because a data output order is a signal for decoding the corresponding multimedia data according to a predetermined method and outputting the data to outside, and the master modem 230 receives raw data generated by the multimedia function unit 280 because a data store order is a signal for encoding the corresponding raw data according to a predetermined method and storing the data in the storage unit 220.

Moreover, if the data store and/or output order is inputted, the master modem 230 determines whether the master codec unit 250 is processing other data, and, if the master codec unit 250 is processing other data, outputs a signal (referred to as "data process order" hereinafter) for having the slave codec unit 260 process data to the slave modem 240. Moreover, the master modem 230 outputs multimedia data received from the storage unit 220 and/or raw data received from the multimedia function unit 280 to the slave modem 240.

On the other hand, in case the master codec unit 250 is not processing other data, the master modem 230 outputs a signal for having the master codec unit 250 process data (referred to as "master codec unit activating order" hereinafter) to the master codec unit 250. If the master codec unit 250 is activated, the master modem 230 controls the master codec unit 250 to process multimedia data received from the storage unit 220 and/or raw data received from the multimedia function unit 280. In other words, the master modem 230 outputs raw data received from the multimedia function unit 280 to the master codec unit 250, and have the raw data encoded according to a predetermined method, and the master modem 230 outputs multimedia data received from the storage unit 220 to the master codec unit 250, and have the multimedia data decoded according to a predetermined method.

Moreover, the master modem 230 outputs multimedia data processed by the master codec unit 250 to the output unit 290 and a raw data processed by the master codec unit 250 to the storage unit 220. In other words, the master modem 230 outputs encoded raw data to the storage unit 220, and decoded multimedia data to the output unit 290.

The slave modem 240 comprises the slave codec unit 260, and processes and controls various kinds of signals in a base band when the MB-MM mobile communication terminal 200 functions in a slave mode (that is the communication mode using a communication system corresponding to the slave modem 240). Particularly, if a data processing order is inputted from the master modem 230, the slave modem 240 determines whether the slave codec unit 260 is processing other data, and outputs a slave codec unit activating order for activating the slave codec unit 260 to the slave codec unit 260 if the slave codec unit 260 is not processing other data.

Moreover, if the slave codec unit 260 is activated, the slave modem 240 outputs an ACK signal to the master modem 230. In case the slave codec unit 260 is processing other data, the slave modem 240 outputs an NACK signal to the master modem 230. Of course, it should be evident to those of ordinary skill in the art that, if the master modem 230 does not receive an ACK signal or NACK signal from the slave modem 240 within a predetermined duration after the master modem 230 outputted a data processing order, the master modem 230 can regard that an ACK signal or NACK signal is received.

Moreover, if the slave modem 240 receives a signal for having the slave codec unit 260 stop processing data from the master modem 230, the slave modem 240 has the slave codec unit 260 stop processing the data. Moreover, if data is inputted from the master modem 230, the slave modem 240 has the slave codec unit 260 process the data. In other words, the slave modem 240 controls the slave codec unit 260 to encode data in case the data, inputted from the master modem 230, is raw data generated by the multimedia function unit 280, and the slave modem 240 controls the slave codec unit 260 to decode data in case the data, inputted from the master modem 230, is multimedia data read in the storage unit 220. Moreover, the slave modem 240 outputs raw data, processed by the slave codec unit 260, to the storage unit 220, and outputs multimedia data, processed by the slave codec unit 260, to the output unit 290. In other words, the slave modem 240 outputs the encoded raw data to the storage unit 220, and the decoded multimedia data to the output unit 290.

Here, it is not essential that the master modem 230 receive multimedia data from the storage unit 220 and input the multimedia data to the slave modem 240, and/or the master modem 230 receive raw data from the multimedia function unit 280 and input the raw data to the slave modem 240 even if the slave modem 240 has the slave codec unit 260 process multimedia data and/or raw data. In other words, it is evident that the master modem 230 can determine whether the master codec unit 250 is processing other data before the master modem 230 receives multimedia data and/or raw data, and, as a result, the slave modem 240 can receive multimedia data from the storage unit 220 directly and can input the multimedia data to the slave codec unit 260, and/or the slave modem 240 can receive raw data from the multimedia function unit 280 directly, and can input the raw data to the slave codec unit 260. Of course, in this case, the storage unit 220 and/or the multimedia function unit 280 should be connected with the slave modem 240 as well as with the master modem 230, unlike the illustration in FIG. 2.

The master codec unit 250 processes various kinds of signals inputted from the master modem 230. Particularly, the master codec unit 250 encodes and/or decodes the multimedia data inputted from the master modem 230 according to a predetermined method.

The slave codec unit 260 processes various kinds of signals inputted from the slave modem 240. Particularly, the slave codec unit 260 encodes and/or decodes the multimedia data inputted from the slave modem 240 according to a predetermined method.

The interface unit 270 interconnects the master modem 230 and the slave modem 240. The modems 230, 240 can exchange information with each other using the interface unit 270. Particularly, the master modem 230 can output a data processing order and/or multimedia data to the slave modem 240 through the interface unit 270. Of course, it should be evident that, as a result of the master modem 230 determining whether the master codec unit 250 is processing other data before receiving multimedia data, if the master modem 230 orders data processing to the slave modem 240 through the interface unit 270, the slave modem 240 will directly receive multimedia data from the storage unit 220 and output the multimedia data to the slave codec unit 260 directly, in case the master codec unit 250 is processing other data.

Moreover, the slave modem 240 can output an ACK signal and/or an NACK signal as an answer for a data processing order to the master modem 230 through the interface unit 270.

The multimedia function unit 280 generates various kinds of raw data. The multimedia function unit 280 can be, for example, a camera unit, a microphone unit and a scanner. For instance, if the multimedia function unit 280 is a camera unit, the camera unit can generate raw data of an image and/or a movie. And if the multimedia function unit 280 is a microphone unit, the microphone unit can generate raw data of a voice. It should be evident that a camera unit can comprise an image sensor, etc. for generating raw data corresponding to an outside image and/or movie. The generated raw data is processed by the master codec unit 250 and/or the slave codec unit 260, and stored in the storage unit 220.

The output unit 290 displays various kinds of pictures, voices, movies and letters that are read by controlling of the master modem 230 and processed by the master codec unit 250 and/or the slave codec unit 260. The output unit 290 can comprise a speaker, an LCD, etc.

Figure 3:
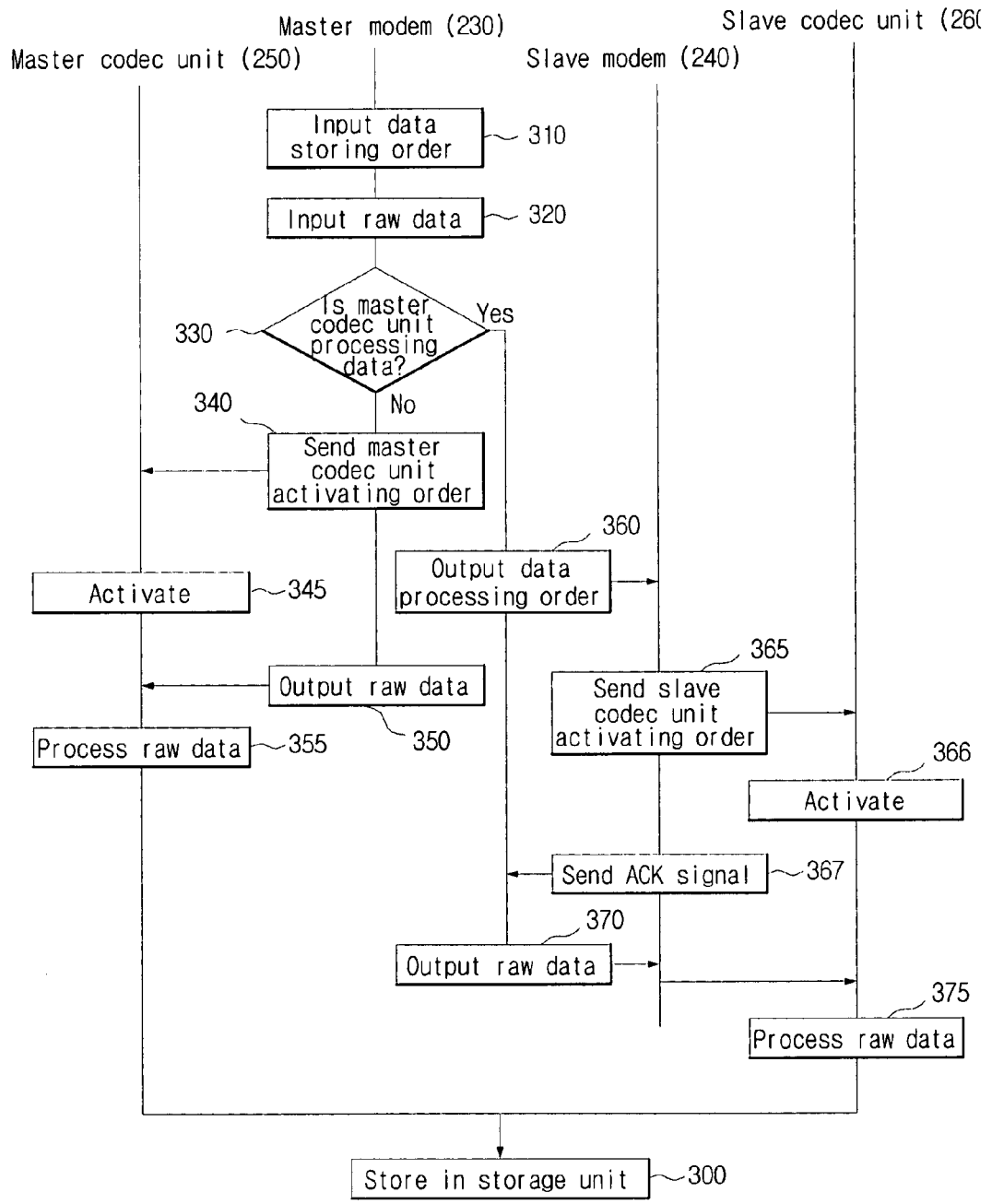
FIG. 3 shows a flowchart of a multitasking method based on one embodiment the present invention.

FIG. 3 shows a flowchart of a multitasking method based on one embodiment of the present invention.

Hereinafter, a multitasking method in an MB-MM mobile communication terminal 200 based on one embodiment of the present invention shall be described in detail with reference to the FIG. 3. In atypical mobile communication terminal, a modem controls various kinds of signals concerning communication only, and an extra control unit controls multimedia functions. However, it is assumed that the multimedia function is controlled by a master modem 230 among modems embodied in the MB-MM mobile communication terminal 200 Therefore, it should be evident to any person of ordinary skill in the art that the present invention can be applied to a typical device in which an extra control unit controls multimedia data. Moreover, it is assumed that the multimedia function unit 280 is a camera unit, and the step of processing the raw data generated by the camera unit 280 is described. Is should be evident the following description can be applied to the case in which the multimedia function unit 280 is a microphone unit or a scanner. Moreover, it is assumed that a slave codec unit 260 is not processing other data.

First of all, the multimedia function unit 280 generates raw data, that is, the camera function unit 280 generates raw data. In detail, the camera function unit 280 generates raw data of an image and/or movie captured by an image sensor through the user's button operation (e.g., instruction to photograph) in the input unit 210. It is evident that the generated raw data is not yet encoded data by a codec unit (250, 260). Here, the step for generating raw data of an image and/or movie is well known to those of ordinary skill in the art, and thus will also be omitted from the description. Of course, it should be evident that the step for generating multimedia data can be omitted in case the data in, for example, a storage unit 220 is processed, not in case a multimedia function unit 280 generates the raw data. However, this case may have to further comprise a step of a master modem 230 reading the multimedia data stored in, for example, a storage unit 220.

In step 310, the master modem 230 receives a data store order from the input unit 210. In further detail, if the user operates buttons in the input unit 210 in order to process and store raw data by a predetermined method (e.g., an order to store a generated image and/or video data), the input unit 210 generates a data store order corresponding to the user's button operation and outputs the data store order to the master modem 230, and the master modem 230 receives this order. Of course, it is evident that the master modem 230 receives a data output order for decoding and outputting multimedia data corresponding to the user's button operation in case the data in, for example, a storage unit 220 is processed, not in case a multimedia function unit 280 generates the raw data.

In step 320, the master modem 230 accesses the multimedia function unit 280 and receives raw data. Of course, it is evident that, in case the data stored in, for example, the storage unit 220 is processed, not in case the multimedia function unit 280 generates raw data, step 320 can be substituted with a step in which the master modem 230 accesses the storage unit 220 and reads multimedia data corresponding to a data processing order.

In step 330, the master modem 230 determines whether the master codec unit 250 is processing other data. As described earlier, this determination can be made by another separate control unit, which is for processing multimedia functions.

If it is determined that the master codec unit 250 is not processing other data, the master modem 230 outputs a master codec unit activating order, in step 340, to the master codec unit 250 to activate the master codec unit 250, in step 345.

If the master codec unit 250 is activated, the master modem 230 outputs, in step 350, the raw data received from the multimedia function unit 280, and the master codec unit 250 processes this raw data in step 355. In further detail, the master codec unit 250 can convert the raw data generated by the camera function unit 280 to a digital signal and encode the converted digital signal.

Here, it is not essential that step 320, in which the master modem 230 receives raw data from the multimedia function unit 280, be processed before step 330. In other words, step 320 can be processed after step 330. In this case, if the master codec unit 250 is not processing other data by the determination in step 330, the master modem 230 can receive the raw data generated by the multimedia function unit 280. However, it is evident that, if the slave codec unit 260 has to process the raw data because the master codec unit 250 is processing other data, the slave modem 240 can receive the raw data to be processed from the multimedia function unit 280 directly, and the slave modem 240 can output the raw data to the slave codec unit 260. Moreover, it is evident that the slave modem 240 can read multimedia data directly from the storage unit 220 and output the multimedia data to the slave codec unit 260 if the data to be processed is multimedia data stored in the storage unit 220. Unlike the illustration in FIG. 2, the storage unit 220 and/or multimedia function unit 280 has to be connected not only to the master modem 230 but also to the slave modem 240 in this case.

However, the slave modem has to process raw data using the slave codec unit 260 equipped in the slave modem 240 in case the master codec unit 250 is processing other data by the determination in step 330. Therefore, the master modem 230 outputs a data processing order to the slave modem 240, in step 360, to have the slave codec unit 260 process raw data, and the slave modem 240, having received this order, outputs a signal for activating the slave codec unit 260 (referred to as "slave codec unit activating order" hereinafter), in step 365, to the slave codec unit 260 and activates the slave codec unit 260 in step 366.

In step 367, the slave modem 240 outputs an ACK signal if the slave codec unit 260 is activated.

In step 370, the master modem 230 outputs raw data to the slave modem 240 if the ACK signal is inputted. Of course, it is evident that the slave modem 240 can access the master modem 230 to receive raw data directly.

Here, the data processing order and/or the raw data, etc. can be outputted from the master modem 230 to the slave modem 240 through the interface unit 270 that connects the master modem 230 with the slave modem 240.

In step 375, the slave modem 240, having received the raw data, outputs this data to the slave codec unit 260, and the slave codec unit 260 processes the raw data. In further detail, the slave codec unit 260 can receive the raw data generated by the camera function unit, convert this data to a digital signal, and encode the converted digital signal.

In step 380, the raw data processed by the master codec unit 250 and/or slave codec unit 260 is outputted to and stored in the storage unit 220. Here, the raw data processed by the slave codec unit 260 can be outputted to the master modem 230 by the control of the slave modem 240, and can be stored in the storage unit 220 by the control of the master modem 230. Or, the raw data can be outputted to and stored in the storage unit 220 directly by the control of the slave modem 240, without the control of the master modem 230.

Here, of course, it is evident that, in case the data stored in, for example, the storage unit 220 is processed, not in case the multimedia function unit 280 generates the raw data, step 380 can be substituted with a step in which the multimedia data processed by the master codec unit 250 and/or slave codec unit 260 is outputted to the output unit 290, and outputted to the outside of the MB-MM mobile communication terminal 200 through the output unit 290.

FIG. 4 shows a flowchart of a multitasking method based on another embodiment of the present invention.

Hereinafter, a multitasking method in an MB-MM mobile communication terminal 200 based on another embodiment of the present invention will be described in detail with reference to FIG. 4. Here, unlike the illustration with reference to FIG. 3, it is assumed that the slave codec unit 260 is processing other data when the master modem 230 outputs a data processing order to the slave modem 240. Moreover, the process before step 410 is the same as the procedures between step 310 and step 360, and thus will be omitted from the description.

In step 410, the slave modem 240 having received a data processing order from the master modem 230 determines whether the slave codec unit 260 is processing other data.

In step 420, if the slave codec unit 260 is determined to be not processing other data, the slave codec unit 260 can process raw data, as described earlier in steps 360-375.

However, if the slave codec unit 260 is determined to be not processing other data, the slave modem 240 outputs an NACK signal to the master modem 230 in step 430 to indicate that the slave codec unit 260 is processing other data.

In step 440, if the master modem receives an NACK signal, the master modem has a pop-up and/or menu window displayed through the output unit 290 such that the user can select a codec unit (250 and/or 260) to stop processing the data. If the user selects a codec unit (250 and/or 260) to stop processing the data by operating the button of the input unit 210, the input unit 210 generates a signal corresponding to the user's button operation (referred to as "codec unit choice signal" hereinafter) and outputs the codec unit choice signal to the master modem 230, and the master modem 230 inputs a data processing stop order to a codec unit corresponding to the codec unit choice signal. Here, there can be various ways to select the codec unit to stop processing data. For example, a predetermined codec unit between the master codec unit 250 and/or the slave codec unit 260 can force the data processing to stop, regardless of the user's choice. Since the method for implementing this is well known to those of ordinary skill in the art, the description will be omitted.

Hereinafter, it is assumed that the master codec unit 250 is the codec unit to stop the data processing, for ease of understanding and description.

In step 450, the master codec unit 250 stops processing the data when a data processing stop order is inputted.

In step 460, if the master codec unit 250 stops processing other data, the master modem 230 outputs the raw data corresponding to the data processing order to the master codec unit 250, and in step 470 the master codec unit 250 processes this order.

In step 480, the raw data processed by the master codec unit 250 and/or the slave codec unit 260 is outputted to and stored in the storage unit 220.

Although it is illustrated in FIG. 4 that the raw data processed by the codec units 250, 260 is directly outputted from each codec unit 250, 260 to the storage unit 220, each modem comprising each codec unit 250, 260 can read the processed raw data from each codec unit 250, 260 and can output this data to the storage unit 220. Moreover, it is evident to any person of ordinary skill in the art that this embodiment of the present invention can be equally or similarly applied in case the codec unit to stop the data processing is the slave codec unit 260.

Moreover, it is evident that, if the master modem 230 doesn't receive an ACK signal or NACK signal from the slave modem 240 within a predetermined duration after the master modem 230 outputted a data processing order, the master modem 230 can regard that an ACK signal or NACK signal is received instead of outputting an ACK signal or NACK signal.

As described above, at least one embodiment of the present invention can provide an MB-MM mobile communication terminal, in which multiple codec units can be used simultaneously or independently, and a multitasking method in the MB-MM mobile communication terminal.

Moreover, at least one embodiment of the present invention can provide an MB-MM mobile communication terminal, in which multiple multimedia functions can be executed simultaneously, and a multitasking method in the MB-MM mobile communication terminal.

Although certain embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A multiband-multimode (MB-MM) mobile communication terminal having multiple multimedia functions, the MB-MM mobile communication terminal comprising:
   a first modem, comprising a first codec unit, configured to i) control the first codec unit to process a first data and ii) output a data processing order if the first codec unit is processing a second data different from the first data; and
   a second modem, comprising the second codec unit, configured to i) activate the second codec unit based on the data processing order and ii) control the second codec unit to process the first data according to the data processing order.

2. The MB-MM mobile communication terminal of claim 1, wherein the second modem is further configured to output a non-acknowledgment (NACK) signal to the first modem if the data processing order is received from the first modem while the activated second codec unit is processing other data.

3. The MB-MM mobile communication terminal of claim 2, wherein the first modem is further configured to i) control the MB-MM mobile communication terminal to enable a user to choose a codec unit to stop data processing if the NACK signal is received from the second modem, and ii) output a data processing stop order to a codec unit corresponding to a codec unit choice signal if a codec unit choice signal corresponding to a user's input is received.

4. The MB-MM mobile communication terminal of claim 2, wherein the first modem is further configured to output a data processing stop order to a predetermined codec unit if the NACK signal is received from the second modem.

5. The MB-MM mobile communication terminal of claim 2, further comprising an interface unit configured to interchange a message between the first modem and the second modem, wherein, via the interface unit, the first modem is further configured to output the data processing order to the second modem, and the second modem is further configured to output the NACK signal to the first modem.

6. The MB-MM mobile communication terminal of claim 1, further comprising an interface unit configured to interchange a message between the first modem and the second modem, wherein, via the interface unit, the first modem is further configured to output the data processing order to the second modem, and the second modem is further configured to output the NACK signal to the first modem.

7. The MB-MM mobile communication terminal of claim 1, wherein the first modem is a master modem and the second modem is a slave modem.

8. A multitasking method in a multiband-multimode (MB-MM) mobile communication terminal having multiple multimedia functions, the multitasking method comprising:
   determining whether a first codec unit of a first modem is processing a first data;
   outputting a data processing order to a second modem such that the first data is processed in a second codec unit of the second modem, if the first codec unit is processing a second data different from the first data;
   outputting an acknowledgement (ACK) signal to the first modem after activating the second codec unit if the second codec unit is not activated; and
   processing, at the second codec unit, the first data according to the data processing order.

9. The method of claim 8, further comprising determining, at the second modem, whether the second codec unit is processing other data, if the data processing order is received from the first modem.

10. The method of claim 9, further comprising:
    outputting, at the second modem, a non-acknowledgment (NACK) signal to the first modem, if the second codec unit is processing other data;
    controlling, at the first modem, the MB-MM mobile communication terminal to enable a user to choose a codec unit to stop data processing if the NACK signal is received from the second modem, and, if a codec unit choice signal corresponding to a user's input is received, outputting a data processing stop order to a codec unit corresponding to a codec unit choice signal; and
    based on the data processing stop order, stopping processing the data and processing newly received data.

11. The method of claim 9, further comprising:
    outputting, at the second modem, a non-acknowledgment (NACK) signal to the first modem if the second codec unit is processing other data;
    outputting, at the first modem, a data processing stop order to a predetermined codec unit if the NACK signal is received by the second modem; and
    based on the data processing stop order, stopping processing the data and processing new received data.

12. The method of claim 8, wherein the first codec unit is included in the first modem and is controlled by the first modem.

13. The method of claim 8, wherein the second codec unit is included in the second modem and is controlled by the second modem.

14. The method of claim 8, wherein the MB-MM mobile communication terminal further comprises an interface unit configured to interchange a message between the first modem and the second modem and wherein the method further comprises:
    outputting, at the first modem, the data processing order to the second modem; and
    outputting, at the second modem, the NACK signal to the first modem, via the interface unit.

15. The method of claim 10, wherein the MB-MM mobile communication terminal further comprises an interface unit configured to interchange a message between the first modem and the second modem and wherein the method further comprises:
    outputting, at the first modem, the data processing order to the second modem; and
    outputting, at the second modem, the NACK signal to the first modem, via the interface unit.

16. A multitasking method in a multiband-multimode (MB-MM) mobile communication terminal having multiple multimedia functions, the method comprising:

determining whether a first codec unit of a first modem is processing a first data;
outputting a data processing order to a second modem if the first codec unit is processing a second data different from the first data; and
processing, at a second codec unit of the second modem, the first data according to the data processing order.

17. A multiband-multimode (MB-MM) mobile communication terminal having multiple multimedia functions, the MB-MM mobile communication terminal comprising:

means for determining whether a first codec unit of a first modem is processing a first data;
means for outputting a data processing order to a second modem if the first codec unit is processing a second data different from the first data; and
means for processing, at a second codec unit of the second modem, the first data according to the data processing order.

* * * * *